United States Patent [19]

Fukuda et al.

[11] Patent Number: 5,182,169
[45] Date of Patent: Jan. 26, 1993

[54] ANTISTATIC HIGHLY ADHESIVE FILM, PROCESS FOR PRODUCING SAID FILM, AND MAGNETIC CARD USING SAID FILM

[75] Inventors: Masayuki Fukuda, Sagamihara; Sadayoshi Miura, Yamato, both of Japan

[73] Assignee: Teijin Limited, Osaka, Japan

[21] Appl. No.: 626,891

[22] Filed: Dec. 13, 1990

[30] Foreign Application Priority Data

Dec. 14, 1989 [JP] Japan .................. 1-324262

[51] Int. Cl.$^5$ .............................................. C09J 7/02
[52] U.S. Cl. .................... 428/343; 428/355; 428/922
[58] Field of Search ............... 428/922, 355, 343

[56] References Cited

U.S. PATENT DOCUMENTS

| | | | |
|---|---|---|---|
| Re. 28,070 | 7/1974 | Brindell | 428/922 |
| 3,134,686 | 5/1964 | Baechtold | 428/922 |
| 3,222,419 | 12/1965 | Jubilee | 428/355 |
| 3,446,651 | 5/1969 | Clachan | 428/922 |
| 3,900,674 | 8/1975 | Coffman | 428/355 |
| 4,294,882 | 10/1981 | Andrews | 428/922 |
| 4,629,663 | 12/1986 | Brown | 428/355 |
| 4,780,357 | 10/1988 | Akao | 428/355 |

FOREIGN PATENT DOCUMENTS

| | | |
|---|---|---|
| 0027699 | 4/1981 | European Pat. Off. . |
| 0118726 | 9/1984 | European Pat. Off. . |
| 2337095 | 2/1974 | Fed. Rep. of Germany . |
| 2855147 | 6/1979 | Fed. Rep. of Germany ...... 428/922 |
| 2152703 | 4/1973 | France . |
| 0072855 | 5/1982 | Japan .................. 428/922 |

Primary Examiner—Jenna L. Davis
Attorney, Agent, or Firm—Wenderoth, Lind & Ponack

[57] ABSTRACT

The present invention relates to a polyester film having an antistatic highly adhesive layer and a process for producing the film, said layer comprising a copolymer (A) and a (co)polymer (B), said copolymer (A) being obtained by copolymerizing $$CH_2=\overset{R_1}{\underset{|}{C}}-R_2,$$

N-methylol acrylamide, and optionally an ethylenic compound having a carboxy group, and optionally a comonomer, and said (co)polymer (B) being obtained by copolymerizing $$R_4-\overset{R_5}{\underset{|}{C}}=\overset{R_6}{\underset{|}{C}}-(R_7)_n-SO_3X$$

and optionally a comonomer. The polyester film of the present invention is useful for magnetic cards and the like.

5 Claims, No Drawings

ANTISTATIC HIGHLY ADHESIVE FILM, PROCESS FOR PRODUCING SAID FILM, AND MAGNETIC CARD USING SAID FILM

The present invention relates to an antistatic highly adhesive film, a process for producing the film, and a magnetic card using the film. More particularly, the present invention relates to an antistatic highly adhesive polyester film having excellent adhesivity to ultraviolet-curing resins and also having antistaticity with excellent durability and stability, a process for efficiently producing the film, and a magnetic card using the film.

A polyester film, particularly a biaxially oriented polyethylene terephthalate film, has excellent mechanical properties, heat resistance and chemical resistance and is used as a base material for magnetic tape, photographic film, wrapping film, metallized film for capacitors electrical insulating film, OHP film, information recording cards etc. The recent growth in demand of said film is very striking. Of these applications, magnetic cards represented by telephone cards, in particular, are expected to show a very high growth in demand hereafter. The polyester film, however, has drawbacks in that since the surface is crystallized and oriented, the film shows high surface cohesivity and very poor adhesivity to various coatings. Therefore, it is necessary to apply an appropriate treatment to the film to impart high adhesivity to the film.

In order to impart high adhesivity to the polyester film, there can be firstly mentioned various means such as corona treatment, plasma treatment, flame treatment and the like. These means, however, have a drawback in that the effect imparted thereby is reduced with the lapse of time. To overcome the above drawback, there is proposed a method of removing the crystallinity of the film surface with a chemical agent. This method, however, is disadvantageous in practical application because the chemical agent is toxic and the vapor generated therefrom causes environmental pollution.

As another means, it is known to coat a coating agent on a biaxially stretched polyester film to form a primer layer of high adhesivity on the film. However, this means also has safety and hygiene problems such as environmental pollution by vaporization of the solvent used in the coating agent, and further has a fear that surface defects are frequently generated as a result of dust deposition because the coating environment is dirty.

Accordingly, if the formation of a primer layer on a polyester film is made during the step of producing the polyester film by using an aqueous coating agent, it is effected in a clean environment, the degree of dust deposition is low, there is neither fear of explosion nor environmental pollution because an aqueous coating agent is used, and this approach is advantageous also in properties of resulting film, economy and safety.

Because of these advantages, it has been proposed to use, as a primer, a water-soluble or water-dispersible polyurethane or a copolymer polyester resin. This primer layer, however, is poor in adhesivity to acrylic resins represented by ultraviolet-curing resins, particularly adhesivity to shear force.

Further, the polyester film has a very large surface resistivity of $\rho_s = 10^{15} - 10^{17}$ $\Omega/58$ and is electrified easily. Therefore, the film easily picks up foreign matters and dust in the processing step, greatly reducing the product yield. The film, even after having been made into products, frequently cause troubles owing to deposition of foreign matters, etc.

To impart an antistatic property to the polyester film, there is known a means wherein an antistatic agent such as a surfactant is incorporated into a polyester. However, this creates problems in that the antistatic agent should not bleed out easily onto the film surface, the antistatic property of the film surface decreases with the lapse of time, and the surface resistivity increases correspondingly therewith. There is also known a means wherein a polyester film is coated with a low molecular antistatic agent. The resulting film, however, has problems in the durability and stability of the imparted antistaticity.

An object of the present invention is to provide an antistatic highly adhesive polyester film having excellent adhesivity to an ultraviolet-curing resin layer and also having antistaticity with excellent durability and stability, for example, antistaticity with a surface resistivity ($\rho_s$) of $10^9 - 10^{13}$ $\Omega/\square$. Another object of the present invention is to provide a preferable process for producing said antistatic highly adhesive polyester film. Still another object of the present invention is to provide a highly durable magnetic card comprising said antistatic highly adhesive polyester film, a print layer made of an ultraviolet-curing ink and a magnetic layer, both layers being provided on the polyester film.

These objects of the present invention can be achieved according to the present invention by:

1. an antistatic highly adhesive film comprising a polyester film and an antistatic highly adhesive layer provided on at least one side of the polyester film, said layer comprising a copolymer (A) and a polymer (B) at a weight ratio of 95:5 to 50:50, the copolymer (A) having a second order transition temperature (Tg) of 10°–80° C. and being obtained by copolymerizing (a) 70–99% by weight of a compound represented by the following formula (I)

[$R_1$ is a hydrogen atom or a methyl group; and $R_2$ is $-COOR_3$ ($R_3$ is a straight or branched alkyl group of 1–20 carbon atoms),

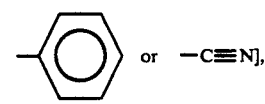

(b) 1–10% by weight of N-methylol(meth)acrylamide,
    (c) 0–5% by weight of an ethylenic compound having a carboxy group in the molecule, other than the compound (a), and
    (d) 0–29% by weight of another compound copolymerizable with the compounds (a) to (c) [the total of (a) to (d) is 100% by weight], and the polymer (B) having a molecular weight of 5,000 or more and being obtained by polymerizing or copolymerizing (e) 30–100% by weight of a compound represented by the following formula (II)

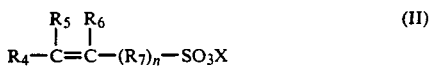

[$R_4$, $R_5$ and $R_6$ are independently a hydrogen atom or a lower alkyl group; $R_7$ is a bivalent organic group; X is an alkali metal or —NH($R_8$)$_3$ ($R_8$ is a hydrogen atom or a lower alkyl group); and n is 0 or 1], and (f) 0–70% by weight of another compound copolymerizable with the compound (e) [the total of (e) and (f) is 100% by weight], 2. a process for producing an antistatic highly adhesive film, which comprises coating, on at least one side of a polyester film which has not completed orientation and crystallization, an aqueous dispersion comprising a copolymer (A) and a polymer (B) at a weight ratio of 95:5 to 50:50, the copolymer (A) having a second order transition temperature (Tg) of 10°–80° C. and being obtained by copolymerizing (a) 70–99% by weight of a compound represented by the following formula (I)

[$R_1$ is a hydrogen atom or a methyl group; and $R_2$ is —COOR$_3$ ($R_3$ is a straight or branched alkyl group of 1-20 carbon atoms),

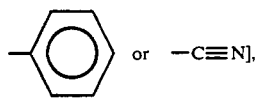

(b) % 1–10% by weight of N-methylol(meth)acrylamide amide, (c) 0–5% by weight of an ethylenic compound having a carboxy group in the molecule, other than the compound (a), and (d) 0–29% by weight of another compound copolymerizable with the compounds (a) to (c) [the total of (a) to (d) is 100% by weight], and the polymer (B) having a molecular weight of 5,000 or more and being obtained by polymerizing or copolymerizing (e) 30–100% by weight of a compound represented by the following formula (II)

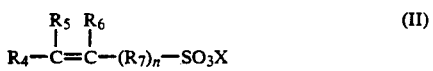

[$R_4$, $R_5$ and $R_6$ are independently a hydrogen atom or a lower alkyl group; $R_7$ is a bivalent organic group; X is an alkali metal or —NH($R_8$)$_3$ ($R_8$ is a hydrogen atom or a lower alkyl group); and n is 0 or 1], and (f) 0–70% by weight of another compound copolymerizable with the compound (e) [the total of (e) and (f) is 100% by weight, then subjecting the coated polyester film to drying, stretching and thermal fixation to complete crystallization and orientation, and 3. a magnetic card comprising an antistatic highly adhesive film of the above 1, an ink layer made of an ultraviolet-curing ink and a magnetic layer, both layers being provided on the film.

In the present invention, the polyester constituting the polyester film is a linear saturated polyester synthesized from (1) an aromatic dibasic acid or an ester-forming derivative thereof and (2) a diol or an ester-forming derivative thereof. Specific examples of the polyester are polyethylene terephthalate, polybutylene terephthalate, polyethylene isophthalate, poly(1,4-cyclohexylene dimethylene terephthalate) and polyethylene 2,6-naphthalenedicarboxylate. The polyester also includes their copolymers, blends of the copolymer with a small proportion of another resin, and the like.

The polyester may contain inorganic or organic fine particles in order to impart slipperiness and light-shielding property to the film produced therefrom. As the fine particles, there can be mentioned, for example, inorganic fillers such as titanium oxide, calcium carbonate, silica barium sulfate, carbon black and the like, as well as organic fillers such as silicone resin, crosslinked acrylic resin, benzoguanamine, teflon, epoxy resin and the like. The polyester may further contain agents for imparting adhesivity or antistaticity, such as polyethylene glycol, sodium dodecylbenzenesulfonate and the like.

The polyester film used in the present invention is an oriented film consisting of the above-mentioned polyester, and can be produced by melt-extruding a polymer, quenching and solidifying the extrudate to obtain a non-stretched film (a non-oriented film), and applying to the film a treatment for orientation and crystallization by biaxial stretching (lengthwise and crosswise) and a treatment for crystallization by thermal fixation. The orientation and crystallization of the polyester film is substantially completed by this thermal fixation. The methods, means, conditions, etc. used in the above production can be those employed conventionally.

In the present invention, the antistatic highly adhesive layer provided on at least one side of the polyester film comprises a copolymer (A) as an adhesivity-imparting component and a polymer (B) as an antistaticity-imparting component.

The copolymer (A) as an adhesivity-imparting component is a copolymer having a second order transition temperature (Tg) of 10°–80° C. and obtained by copolymerizing (a) 70–99% by weight of a compound represented by the following formula (I)

[$R_1$ is a hydrogen atom or a methyl group; and $R_2$ is —COOR$_3$ ($R_3$ is a straight or branched- alkyl group of 1-20 carbon atoms)

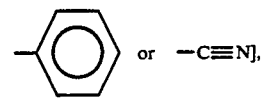

(b) % by weight of N-methylol(meth)acrylamide,
(c) 0–5% by weight of an ethylenic compound having a carboxy group in the molecule, other than the compound (a), and (d) 0-29% by weight of another compound copolymerizable with the compounds (a) to (c).

As the compound (a) represented by the formula (I), there can firstly be mentioned those compounds of the formula (I) wherein $R_1$ is a hydrogen atom or a methyl group and $R_2$ is $COOR_3$ ($R_3$ is a straight or branched alkyl group of 1-20 carbon atoms), i.e. alkyl acrylates or alkyl methacrylates. In the alkyl acrylates, $R_3$ is preferably a straight or branched alkyl group of 1-20 carbon atoms. Examples of such an alkyl group include methyl group, ethyl group, n-propyl group, isopropyl group, n-butyl group, isobutyl group, tert-butyl group, n-pentyl group, n-hexyl group, n-heptyl group, n-octyl group, 2-ethylhexyl group, n-nonyl group, isononyl group and n-decyl group. Specific examples of the alkyl acrylates are methyl acrylate, ethyl acrylate, n-butyl acrylate, isobutyl acrylate, 2-ethylhexyl acrylate, n-octyl acrylate and isononyl acrylate. In the alkyl methacrylatess, $R_3$ is preferably a straight or branched alkyl group of 1-20 carbon atoms, preferably a straight or branched alkyl group of 1-4 carbon atoms. Examples of such an alkyl group include methyl group, ethyl group, n-propyl group, isopropyl group, n-butyl group and isobutyl group. Specific examples of the alkyl methacrylates are methyl methacrylate, ethyl methacrylate, n-butyl methacrylate and isobutyl methacrylate.

As the compound (a), there can also be mentioned those compounds of the formula (I) wherein $R_1$ is a hydrogen atom or a methyl group and $R_2$ is a phenyl group, i.e. aromatic vinyl compounds such as styrene, alphamethylstyrene, vinyltoluene, ethylvinylbenzene and the like. There can further be mentioned those compounds of the formula (I) wherein $R_2$ is a cyano group, i.e. vinyl cyanide compounds such as acrylonitrile, methacrylonitrile and the like.

The compound (a) is used in an amount of 70-99% by weight, preferably 75-95% by weight based on 100% by weight of the total of the compounds (a) to (d).

The compound (b) is selected from N-methylolacrylamide and N-methylolmethacrylamide. These can be used alone or in combination. The compound (b) is used in an amount of 1-10% by weight, preferably 3-6% by weight based on 100% by weight of the total of the compounds (a) to (d).

The compound (c) is an ethylenic compound having a carboxyl in the molecule, other than the compounds (a). It includes, for example, alpha,beta-mono- or diunsaturated carboxylic acids of 3-5 carbon atoms such as acrylic acid, methacrylic acid, crotonic acid, citraconic acid, itaconic acid, maleic acid, fumaric acid and the like; anhydrides of alpha,beta-diunsaturated carboxylic acids of 3-5 carbon atoms, such as maleic anhydride and the like; monoalkyl esters of alpha,beta-diunsaturated carboxylic acids of 3-5 carbon atoms, such as monobutyl maleate, monobutyl fumarate, monoethyl itaconate and the like; and ammonium salts or alkali metal salts of ethylenic carboxylic acids or monoalkyl esters of alpha,beta-diunsaturated carboxylic acids, such as sodium acrylate, ammonium methacrylate and the like. The compound (c) can be used in an amount of 0-5% by weight, preferably 0.5-3% by weight based on 100% by weight of the total of the compounds (a) to (d).

The compound (d) is a compound other than the compounds (a) to (c), copolymerizable with them. It includes, for example, amides of ethylenic carboxylic acids, such as acrylamide, methacrylamide, diacetone acrylamide and the like; esters between ethylenic carboxylic acid and epoxy group-containing alcohol, such as glycidyl acrylate, glycidyl acrylate, glycidyl methacrylate and the like; hydroxyalkyl esters of ethylenic carboxylic acids, such as 2-hydroxyethyl acrylate, 2-hydroxypropyl acrylate, 2-hydroxyethyl methacrylate and the like; esters between ethylenic carboxylic acid and amino group-containing alcohol, such as dimethylaminoethyl methacrylate, diethylaminoethyl methacrylate and the like; and compounds having at least two unsaturated groups, such as divinylbenzene, diallyl phthalate, triallyl cyanurate, diethylene glycol dimethacrylate and the like. The compound (d) can be used in an amount of 0-29% by weight based on 100% by weight of the total of the compounds (a) to (d).

In the present invention, the copolymer (A) has a second order transition temperature (Tg) of 10°-80° C., preferably 20°-60° C. When the second order transition temperature is less than 10° C., it is difficult to obtain adhesivity intended by the present invention, to ultraviolet-curing resins representative of acrylic resins, particularly adhesivity to shear force. When the second order transition temperature is more than 80° C., no sufficient film strength is obtained owing to poor film-formability, etc. and it is difficult to obtain the effect intended by the present invention.

In the present invention, the polymer (B) as an antistaticity-imparting component, constituting the antistatic highly adhesive layer, is a polymer having a molecular weight of 5,000 or more and is obtained by polymerizing or copolymerizing (e) 30-100% by weight of a compound represented by the following formula (II)

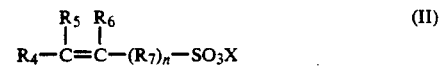

[$R_4$, $R_5$ and $R_6$ are independently a hydrogen atom or a lower alkyl group; $R_7$ is a bivalent organic group; X is an alkali metal or $-NH(R_8)_3$ ($R_8$ is a hydrogen atom or a lower alkyl group); and n is 0 or 1], and (f) 0-70% by weight of another compound copolymerizable with the compound (e).

As the lower alkyl group of $R_4$, $R_5$, $R_6$ and $R_8$ in the formula (II), there can be mentioned methyl, ethyl, etc. As the bivalent organic group of $R_7$, there can be mentioned, for example, alkylene groups of 1-6 carbon atoms, substituted alkylene groups having an alkyl substituent of 1-4 carbon atoms and organic groups containing hetero-atom(s) (e.g. N, O, S). As the alkali metal of X, there can be mentioned Na, K, etc.; and as the $-NH(R_8)_3$ of X, there can be mentioned $-NH_4$, $-NH(CH_3)_3$, etc.

Specific examples of the compound (e) represented by the formula (II) include sodium allylsulfonate, sodium methallylsulfonate, sodium crotylsulfonate, lithium allylsulfonate, lithium methallylsulfonate, lithium crotylsulfonate, potassium allylsulfonate, potassium methallylsulfonate, ammonium allylsulfonate, ammonium methallylsulfonate.

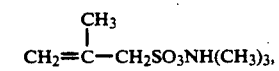
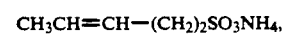

-continued $(CH_3)_2C=CH-CH_2CH_2OCH_2CH_2SO_3K$, $CH_2=CH-CH_2CH_2SCH_2CH_2SO_3Na$, $CH_2=CH-CH_2CH_2NHCH_2CH_2SO_3K$, $$C_2H_5CH=\overset{CH_3}{\underset{|}{C}}-CONHCH_2CH_2SO_3Na,$$

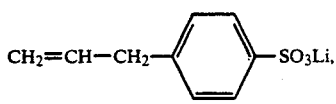

and $CH_2=CHSO_3Na$, $$CH_2=\overset{CH_3}{\underset{|}{C}}-COOC_2H_4SO_3Na$$

The compound (e) can be used in an amount of 30–100% by weight, preferably 30–80% by weight, more preferably 50–80% by weight based on 100% by weight of the total of the compounds (e) and (f).

The compound (f) is another compound copolymerizable with the compound (e) and includes, for example, alpha,beta-mono- or diunsaturated carboxylic acids such as acrylic acid, methacrylic acid, crotonic acid, citraconic acid, itaconic acid, maleic acid, fumaric acid and the like; anhydrides of alpha,beta-diunsaturated carboxylic acids, such as maleic anhydride and the like; monoalkyl esters of alpha,beta-diunsaturated carboxylic acids, such as monobutyl maleate, monobutyl fumarate, monoethyl itaconate and the like; ammonium salts or alkali metal salts of ethylenic carboxylic acids or monoalkyl esters of alpha,beta-diunsaturated carboxylic acids, such as sodium acrylate, ammonium methacrylate and the like; acrylic acid esters such as methyl acrylate, ethyl acrylate, n-butyl acrylate, isobutyl acrylate, 2-ethylhexyl acrylate, n-octyl acrylate, isononyl acrylate and the like; methacrylic acid esters such as methyl methacrylate, ethyl methacrylate, n-butyl methacrylate and the like; aromatic vinyl compounds such as styrene, alpha-methylstyrene, vinyltoluene, ethylvinylbenzene and the like; vinyl cyanides such as acrylonitrile, methacrylonitrile and the like; amides of ethylenic carboxylic acids, such as acrylamide, methacrylamide, diacetone acrylamide and the like; esters between ethylenic carboxylic acid and epoxy group-containing alcohol, such as glycidyl acrylate, glycidyl methacrylate and the like; hydroxyalkyl esters of ethylenic carboxylic acids, such as 2-hydroxyethyl acrylate, 2-hydroxypropyl acrylate, 2-hydroxyethyl methacrylate and the like; esters between ethylenic carboxylic acid and amino group-containing alcohol, such as dimethylaminoethyl methacrylate, diethylaminoethyl methacrylate and the like; and compounds having at least two unsaturated groups, such as divinylbenzene, diallyl phthalate, triallyl phthalate, diethylene glycol dimethacrylate and the like. The compound (f) can be used in an amount of 0–70% by weight, preferably 20–70% by weight, more preferably 20–50% by weight based on 100% by weight of the total of the compounds (e) and (f).

The polymer (B) of the present invention has a molecular weight of 5,000 or more. When the molecular weight is less than 5,000, it is difficult to sufficiently obtain the durability and stability of antistaticity as intended by the present invention.

The copolymer (A) and the polymer (B) are used at a weight ratio of 95:5 to 50:50, preferably 90:10 to 70:30. When the proportion of the polymer (B) is less than 5% by weight, it is difficult to obtain the anti-staticity intended by the present invention. When the proportion of the copolymer (A) is less than 50% by weight, it is difficult to obtain adhesivity to ultraviolet-curing resins.

The copolymer (A) and the polymer (B) of the present invention can ordinarily be produced by emulsion polymerization. For example, an aqueous dispersion of the copolymer (A) can be obtained by emulsion-polymerizing the compounds appropriately selected from the compounds (a) to (d), in an aqueous medium in the presence of a surfactant or a protective colloid. An aqueous dispersion of the polymer (B) can be obtained by emulsion-polymerizing the compound(s) appropriately selected from the compounds (e) and (f), in an aqueous medium in the presence of a surfactant or a protective colloid. At that time, the surfactant is used in an amount of preferably about 0.5–7% by weight, more preferably about 1–5% by weight based on 100% by weight of the total of the compounds (a) to (d) or the compounds (e) and (f), and the protective colloid is used in an amount of preferably 0–3% by weight on the same basis. When the amount of the surfactant is too small, the stability of emulsion polymerization is reduced and the storage stability of the resulting aqueous dispersion of (co)polymer is reduced.

As the surfactant, there can be used nonionic surfactants, anionic surfactants, cationic surfactants and amphoteric surfactants. As the nonionic surfactants, there can be mentioned, for example, polyoxyalkylene alkyl ethers such as polyoxyethylene lauryl ether, polyoxyethylene stearyl ether and the like; polyoxyalkylene alkyl phenol ethers such as polyoxyethylene octyl phenol ether and the like; sorbitan-fatty acid esters such as sorbitan monolaurate, sorbitan monostearate, sorbitan trioleate and the like; polyoxyalkylene sorbitan-fatty acid esters such as polyoxyethylene sorbitan monolaurate and the like; polyoxyalkylene-fatty acid esters such as polyoxyethylene monolaurate, polyoxyethylene monostearate and the like; glycerine-fatty acid esters such as oleic acid monoglyceride, stearic acid monoglyceride and the like; and polyoxyethylene, polypropylene block copolymer, etc. As the anionic surfactants, there can be mentioned, for example, fatty acid salts such as sodium oleate and the like; alkylarylsulfonic acid salts such as sodium dodecylbenzenesulfonate and the like; alkyl sulfate salts such as sodium lauryl sulfate and the like; alkyl sulfosuccinate salts and their derivatives such as sodium monooctyl sulfosuccinate, sodium dioctyl sulfosuccinate, sodium polyoxyethylene lauryl sulfosuccinate and the like; salts of polyoxyalkylene alkyl ether sulfates, such as sodium polyoxyethylene lauryl ether sulfate and the like; and salts of polyoxyalkylene alkyl aryl ether sulfates, such as polyoxyethylene nonyl phenol ether sulfate and the like. As the cationic surfactants, there can be mentioned, for example, alkylamine salts such as laurylamine acetate and the like; quaternary ammonium salts such as lauryl trimethyl ammonium chloride, alkyl benzyl dimethyl ammonium chloride and the like; and polyoxyethylalkylamines. As the amphoteric surfactants, there can be mentioned, for example, alkylbetaines such as laurylbetaine and the like. There can further be used compounds obtained by substituting part of the hydrogen atoms of the alkyl group of the above surfactants with fluorine. There can furthermore be used so-called reactive surfactants having radical-polymerizable double bond(s) in the molecule.

As the protective colloid, there can be mentioned, for example, polyvinyl alcohols such as partially saponified polyvinyl alcohol, completely saponified polyvinyl alcohol, modified polyvinyl alcohol and the like; cellulose derivatives such as hydroxyethyl cellulose, hydroxypropyl cellulose, carboxymethyl cellulose and the like; and natural polysaccharides such as guar gum and the like.

The above-mentioned "in an aqueous medium" refers to "in water" or "in an aqueous solution of a water-soluble organic solvent". The water-soluble organic solvent is not particularly restricted, and includes water-soluble alcohols (e.g. methyl alcohol, ethyl alcohol, isopropyl alcohol), water-soluble ketones (e.g. ketone), water-soluble ethers (e.g. methyl cellosolve, cellosolve, butyl cellosolve, carbitol, butylcarbitol), etc. These can be used alone or in mixture of two or more. The solvent can be used in a concentration of preferably 0 to about 50% by weight in its aqueous solution. However, emulsion polymerization is preferably conducted in water containing substantially no organic solvent, in view of the stability of the resulting aqueous dispersion of (co)polymer, safety, hygiene and environmental pollution.

In the emulsion polymerization, it is preferable to use at least one polymerization initiator selected from persulfuric acid salts (e.g. ammonium persulfate, potassium persulfate), organic peroxides (e.g. tert-butyl hydroperoxide, cumene hydroperoxide, paramenthane hydroperoxide), hydrogen peroxide and the like. The polymerization initiator is used in a preferable amount of 0.05-1% by weight, particularly 0.1-0.7% by weight, more particularly 0.1-0.5% by weight based on 100% by weight of the total of the compounds (a) to (d) or the compounds (e) and (f).

In the emulsion polymerization, a reducing agent can also be used optionally. Examples of the reducing agent include reducing organic compounds such as ascorbic acid, tartaric acid, citric acid, grape sugar and the like, and reducing inorganic compounds such as sodium thiosulfate, sodium sulfite, sodium bisulfite, sodium metabisulfite and the like. The amount of the reducing agent can be appropriately selected, but is preferably, for example, about 0.05 to about 1% by weight based on 100% by weight of the total of the compounds (a) to (d) or the compounds (e) and (f).

In the present invention, the aqueous coating solution can be prepared by mixing the above-obtained aqueous dispersion of the copolymer (A) and the above-obtained aqueous dispersion of the polymer (B) at a weight ratio [in terms of the copolymer (A) and the polymer (B)] of 95:5 to 50:50. In this case, the copolymer (A) and the polymer (B) may be used each in two or more kinds. In the aqueous dispersion, the copolymer (A) preferably has an average particle diameter of 0.01–0.3 μm. Each aqueous dispersion can be used as it is or after appropriately diluting with water or the like.

In the present invention, the antistatic highly adhesive layer is formed by coating the above aqueous coating solution on at least one side of a polyester film and then drying the coated film. The coating is conducted preferably on a polyester film which has not completed orientation and crystallization. In the coating, a surfactant as a wetting agent may be used as necessary. There may also be used, as a thickening agent, a polyvinyl alcohol, a cellulose derivative, a polycarboxylic acid type resin, a surfactant, etc. There may further be used, as necessary, an aqueous solution or dispersion of a resin such as epoxy resin, amino resin, polyester resin, polyurethane resin, blocked isocyanate resin or the like, at such a level that the effect of the present invention is not impaired. There may furthermore be added an organic or inorganic filler (e.g. titanium oxide, clay, talc, calcium carbonate, silica, aluminum hydroxide, asbestos, carbon black and Phthalocyanine Blue), a pigment, a dye, a film-forming aid (e.g. butyl cellosolve, butyl carbitol), an antioxidant, an antiseptic, an ultraviolet absorber, etc.

The coating of the aqueous coating solution (i.e. antistatic highly adhesive aqueous anchor coat solution) on a polyester film which has not completed orientation and crystallization, is conducted preferably on the surface of a polyester film right after the melt extrusion and subsequent casting, or on the surface of a polyester film right after unidirectional (lengthwise or crosswise) stretching. In a usual process, coating is applied onto a monoaxially (lengthwise) stretched polyester film to form a primer layer; then crosswise stretching is conducted with heating; thereafter, the film is subjected to thermal fixation at a high temperature and simultaneously the thermal curing of the primer layer is completed. Formation of an antistatic highly adhesive primer layer can be effected by a known coating method such as spray coating, air knife coating, reverse roll coating, kiss roll coating, gravure coating, Meyer bar coating, roll brush coating or the like. The concentration of the coating solution varies depending upon the coating method but is generally 0.5-50% by weight. The amount coated is preferably 1-20 g/m$^2$ as wet amount.

The antistatic highly adhesive film of the present invention has antistaticity with excellent durability, for example antistaticity having a surface resistivity of $10^9 - 10^{13}$ Ω/□, and further has excellent printability to various printing inks (e.g. ultraviolet-curing resins) and excellent adhesivity, particularly adhesivity to shear force. Accordingly, it is useful particularly as a base material for magnetic cards (e.g. telephone card, prepaid card) to which printing using an ultraviolet-curing ink is applied usually. The magnetic card obtained by forming, onto the antistatic highly adhesive film, an ink layer made of an ultraviolet-curing ink and a magnetic layer, is characterized in that the ink layer and the magnetic layer have been adhered to the base film with a high adhesive strength. The formation of the ink layer and the magnetic layer can be conducted by a conventionally known or conventionally employed means.

The antistatic highly adhesive film of the present invention has excellent adhesivity also to other coating layers (top coat layer). Accordingly, it is useful as a base material for ordinary industrial applications such as abrasive tape, chemical matte film, membrane, diazo photosensitive film, label, OHP film and the like, as well as for magnetic tape and disc applications such as video tape, audio tape, computer tape, floppy disc and the like. Further, the antistatic highly adhesive film of the present invention has excellent antistaticity, and accordingly generates substantially no static electricity, can significantly reduce deposition of foreign matters, dust, etc. in the film processing step, and can increase product yield in the processing step. Furthermore, the present film can maintain antistaticity for a long period of time after having been processed into products, and accordingly the products made therefrom are substantially free from troubles associated with static electricity, during use.

The present invention is hereinafter described in more detail by way of Examples. In the Examples, property values were obtained by measurement according to the following methods. Also in the Examples, "parts" are parts by weight.

(1) Adhesivity

An ultraviolet-curing type printing ink (Flash Dry FDO Geranium APN) manufactured by TOYO INK MGF. CO., LTD.) is applied onto a polyester film provided with an antistatic highly adhesive layer, by a RI tester manufactured by Akira Seisakusho. The resulting film is subjected to curing by using a medium-pressure mercury lamp (80 W/cm, one lamp, manufactured by Nippon Denchi) to form thereon an ultraviolet ink layer of 7.0 $\mu$m in thickness.

Evaluation (1)

A cellotape manufactured by Nichiban, of 18 mm in width is attached onto the above ultraviolet ink layer, and 180° reverse peeling is conducted at a high speed of 100 m/min. The condition of peeling is observed and adhesivity is expressed by the peeling load (g/18 mm) obtained.

Evaluation (2)

Cuts of checker pattern are formed on the ultraviolet ink layer with a cutting knife. A cellotape is attached thereonto, and 90° normal peeling is conducted. The condition of peeling is expressed in five levels of 5 to 1 (5 is good and 1 is poor).

Evaluation (3)

The ultraviolet ink layer is scratched with nails and the degree of the fall off is expressed in five levels of 5 to 1 (5 is good and 1 is poor).

(2) Antistaticity

Evaluation (1)

A film is allowed to stand for 24 hours under conditions of 23° C.×50% R.H. and then measured for surface resistivity by a vibrating capacitor type potentiometer (TR-84M manufactured by Takeda Riken). Antistaticity is expressed by the surface resistivity obtained.

Evaluation (2)

A film is allowed to stand for 24 hours under conditions of 23° C.×50% R.H. The resulting film is electrified by a static honestmeter (S-5109 manufactured by Shishido Electrostatic Ltd.) and the reduction of the charged amount is examined. Antistaticity is expressed by the half-life (sec) of the charge amount.

EXAMPLES 1-6 AND COMPARATIVE EXAMPLES 1-3

A polyethylene terephthalate having an intrinsic viscosity of 0.55 as measured at 25° C. in o-chlorophenol, containing 10% by weight of anatase titanium oxide of 0.2 $\mu$ in average particle diameter and 1% by weight of silica of 4 $\mu$in particle diameter was melt-extruded from a T die. The extrudate was cooled on a drum of 40° C. with static electricity being applied, to obtain a non-stretched film of 1.8 mm in thickness. Subsequently, the film was heated to 90° C. and stretched 3.0-fold lengthwise. On the resulting uniaxially stretched film was coated, by kiss coating, one of the aqueous coating solutions (solid content =2% by weight) whose solid compositions were shown in Table 1. The amount coated (wet amount) was 4 g (coating solution)/m².

The coated film was crosswise stretched 3.2-fold at 110° C. and heat-treated at 220° C. to obtain various biaxially oriented (antistatic highly adhesive) polyester films of 188 $\mu$m in thickness.

The properties of the obtained films are shown in Table 1.

In Comparative Example 1, only the adhesivity-imparting component (A) was coated; in Comparative Example 2, only the antistaticity-imparting component (B) was coated; and in Comparative Example 3, no aqueous coating solution was coated.

TABLE 1

| | Adhesivity-imparting component (A) *1 | Antistaticity-imparting component (B) *1 | Nonionic surfactant |
|---|---|---|---|
| Example 1 | Copolymer ① 75 parts | Copolymer ③ 18 parts | Nonion NS-208.5*2 5 parts |
| Example 2 | Copolymer ① 70 parts | Copolymer ③ 23 parts | Nonion N-208.5*2 5 parts |
| Example 3 | Copolymer ① 80 parts | Copolymer ③ 13 parts | Nonion N-208.5*2 5 parts |
| Example 4 | Copolymer ② 75 parts | Copolymer ③ 18 parts | Nonion N-208.5*2 5 parts |
| Example 5 | Copolymer ① 75 parts | Copolymer ④ 18 parts | Nonion NS-208.5*2 5 parts |
| Example 6 | Copolymer ① 75 parts | Copolymer ⑤ 18 parts | Nonion NS-208.5*2 5 parts |
| Comparative Example 1 | Copolymer ① 95 parts | Not used | Nonion NS-208.5*2 5 parts |
| Comparative Example 2 | Not used | Copolymer ③ 95 parts | Nonion NS-208.5*2 5 parts |
| Comparative Example 3 | Not used | Not used | Not used |

*1 The compositions of the copolymers ① to ⑤ are shown in Table 2.
*2 Manufactured by Nippon Oil & Fats Co., Ltd.

TABLE 2

| | Monomer composition of copolymer | | | | | | | | |
|---|---|---|---|---|---|---|---|---|---|
| | MMA | EA | AN | N-MAM | MAA | MA | SEM | SMS | VS |
| Copolymer ① | 40 | 44 | 10 | 5 | 1 | — | — | — | — |
| Copolymer ② | 40 | 46 | 5 | 8 | 1 | — | — | — | — |
| Copolymer ③ | — | — | 1 | — | — | 34 | — | 65 | — |
| Copolymer ④ | 46 | 24 | — | — | — | — | 30 | — | — |

TABLE 2-continued

| | Monomer composition of copolymer | | | | | | | | |
|---|---|---|---|---|---|---|---|---|---|
| | MMA | EA | AN | N-MAM | MAA | MA | SEM | SMS | VS |
| Copolymer ⑤ | 46 | 24 | — | — | — | — | — | — | 30 |

The symbols in the above refer to the followings.
MMA: Methyl methacrylate
EA: Ethyl acrylate
AN: Acrylonitrile
N-MAM: N-methylolacrylamide
MAA: Methacrylic acid
MA: Methyl acrylate
SEM: Sodium 2-sulfoethylmethacrylate
SMS: Sodium methallylsulfonate
VS: Sodium vinylsulfonate

TABLE 3

| | Adhesivity | | | Antistaticity | |
|---|---|---|---|---|---|
| | Evaluation (1) | Evaluation (2) | Evaluation (3) | Evaluation (1) | Evaluation (2) |
| Example 1 | 620 | 4 | 4 | $1 \times 10^{12}$ | 10 |
| Example 2 | 580 | 4 | 3 | $8 \times 10^{11}$ | 5 |
| Example 3 | 610 | 4 | 4 | $7 \times 10^{12}$ | 30 |
| Example 4 | 570 | 4 | 5 | $3 \times 10^{12}$ | 10 |
| Example 5 | 640 | 4 | 5 | $8 \times 10^{11}$ | 5 |
| Example 6 | 590 | 4 | 4 | $3 \times 10^{12}$ | 10 |
| Comparative Example 1 | 580 | 4 | 5 | $10^{15}<$ | Not reduced |
| Comparative Example 2 | 100 | 2 | 2 | $8 \times 10^{10}$ | <1 |
| Comparative Example 3 | 20 | 1 | 1 | $10^{15}<$ | Not reduced |

We claim:

1. An antistatic highly adhesive film having high adhesivity to an ultraviolet curing resin layer and a magnetic layer, and comprising a polyester film and an antistatic highly adhesive layer provided on at least one side of the polyester film, said adhesive layer comprising a copolymer (A) and a polymer (B) at a weight ratio of 95:5 to 50:50, the copolymer (A) having a second order transition temperature (Tg) of 10°-80° C. and being obtained by copolymerizing (a) 70-99% by weight of a compound represented by the following formula (I)

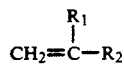

wherein $R_1$ is a hydrogen atom or a methyl group; and $R_2$ is —$COOR_3$ in which $R_3$ is a straight or branched alkyl group of 1-20 carbon atoms, or $R_2$ is

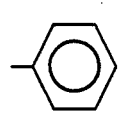

or —C"N, (b) 1-10% by weight of N-methylol(meth)acrylamide,
(c) 0-5% by weight of an ethylenic compound having a carboxy group in the molecule, other than the compound (A), and
(d) 0-29% by weight of another compound copolymerizable with the compounds (a) to (c), the total of (a) to (d) being 100% by weight, and the polymer (B) having an molecular weight of 5,000 or more and being obtained by polymerizing or copolymerizing (e) 30-100% by weight of a compound represented by the following formula (II)

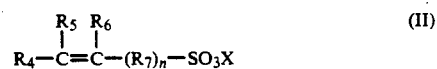

wherein $R_4$, $R_5$ and $R_6$ are independently a hydrogen atom or a lower alkyl group; $R_7$ is a bivalent organic group; X is an alkali metal or —$NH(R_8)_3$ in which $R_8$ is a hydrogen atom or a lower alkyl group; and n is 0 or 1, and (f) 0-70% by weight of another compound copolymerizable with the compound (e), the total of (e) and (f) being 100% by weight.

2. The antistatic highly adhesive film according to claim 1, wherein the antistatic highly adhesive layer comprises the copolymer (A) obtained by copolymerizing 75-95% by weight of the compound (a), 3-6% by weight of N-methylol(meth)acrylamide (b), 0.5-3% by weight of the ethylenic compound (c) and 0-29% by weight of the compound (d) and the polymer (B) obtained by copolymerizing 30-80% by weight of the compound (e) and 20-70% by weight of the compound (f), at a weight ratio of 90:10 to 70:30.

3. The antistatic highly adhesive film according to claim 2, wherein the copolymer (B) is obtained by copolymerizing 50-80% by weight of the compound (e) and 20-50% by weight of the compound (f).

4. The antistatic highly adhesive film according to claim 2, wherein the compound (e) is sodium methallylsulfonate or sodium vinylsulfonate.

5. The antistatic highly adhesive film according to claim 3, wherein the compound (e) is sodium methallylsulfonate.

* * * * *